July 27, 1937. C. M. FISH 2,088,508

BRACE FOR MOLDBOARD PLOWS

Filed June 27, 1936

Inventor
C. M. Fish
By L. F. Laudrupt Jr.
Attorney

Patented July 27, 1937

2,088,508

UNITED STATES PATENT OFFICE 2,088,508

BRACE FOR MOLDBOARD PLOWS

Charlie M. Fish, Kingsport, Tenn.

Application June 27, 1936, Serial No. 87,782

6 Claims. (Cl. 97—113)

The invention relates to mold-board plows, and particularly to the means for bracing the handles and mold-board and land-side, and has for its principal object the provision of a brace for the purpose stated that will eliminate the hooking of dirt and clods between the mold-board and land-side that is now experienced, and on the contrary to provide means for bracing the parts, referred to, whereby there is an open throat provided so that dirt and clods are immediately discharged from between the mold-board and the land-side after being deposited therein.

A further object of the invention is the provision of a brace made in one piece, and substantially U-shaped, the bight of the U-shaped brace serving to brace the plow handles apart, while the wide arms of the brace are extended downwardly from the bight portion and engage the mold-board and land-side respectively.

The invention will be described in detail hereinafter and will be found illustrating the accompanying drawing in which:—

In the drawing similar reference characters are used to designate corresponding parts in all of the views.

Figure 1:
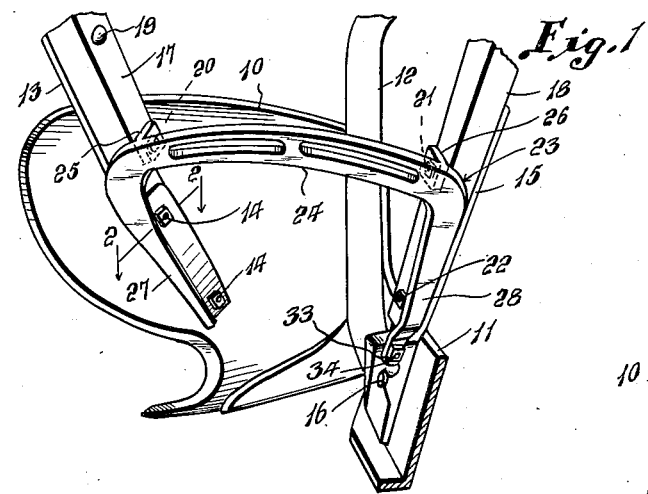
Figure 1 is a rear view in perspective of the mold-board plow share showing the handles and beam fragmentarily, the invention being disclosed as applied to a left-hand mold-board plow.
Figure 2:
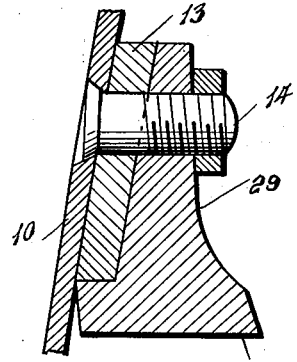
Figure 2 is a fragmentary sectional view on a plane indicated by the line 2—2 of Figure 1.

In Figure 1 the invention is disclosed as applied to a mold-board plow share, in which 10 designates the mold-board, 11 the land-side, 12 the end of the plow beam attached to the share, 13 the handle support secured by means of bolts 14 to the mold-board 15 the handle support secured to the land-side, one of the bolts for securing the support being designated 16. The handles 17 and 18 are secured to the supports 13 and 15, respectively, by means of bolts 19 and 20 secured through the handle 17, and bolts 21 and 22 secured through the handle 18.

Figure 3:
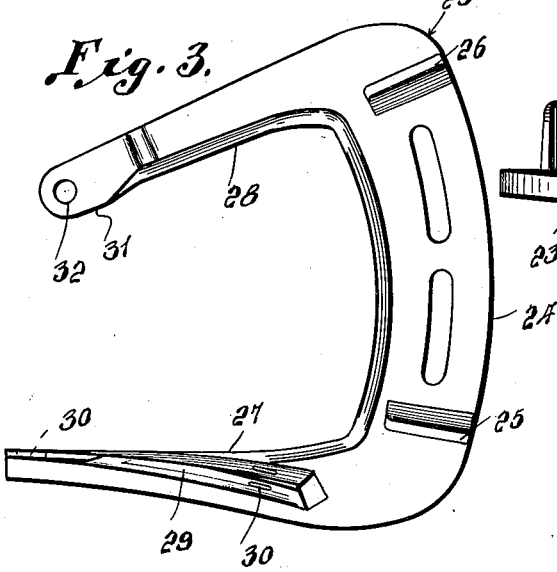
Figure 3 is a plan view of the brace, the side shown being that presented toward the front end of the plow share as shown in Figure 1.

The improved brace member is as disclosed in Figures 1 and 3 substantially U-shaped, and is mounted in an inverted position as disclosed in Figure 1. The brace member is designated 23, and the bight portion 24 is provided with outstanding ears or lugs 25, 26, and are secured to the bolts 20 and 21 respectively. This bight portion it will be apparent provides a cross brace for the secured ends of the handles and also braces the mold-board 10 and the land-side 11 through the connections of the handles 17 and 18 thereto by means of the supports 13 and 15, respectively.

The side arms 27 and 28 are provided to be secured through the mold-board and land-side, respectively, of the plow share, the side arm 27 being provided with an outstanding flange or wing 29 having openings 30 therein to receive bolts 14.

The other depending arm 28 has its end offset as shown at 31, and is provided with an opening 32 to be secured to a flange 33 on the lower end of the handle support 15 by means of a bolt 34.

Figure 5:
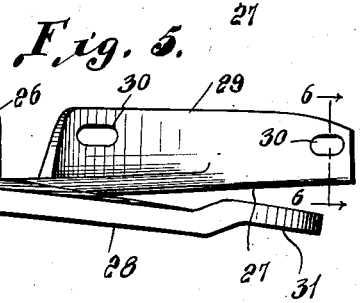
Figures 4 and 5 are side views in elevation of the brace member from opposite sides of the member.
Figure 6:
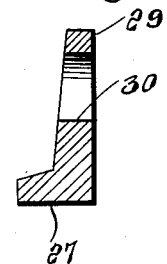
Figure 6 is a sectional detail on an enlarged scale on a plane indicated by the line 6—6 of Figure 5.
Figure 4:
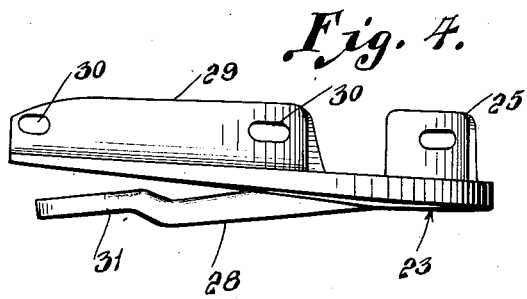

It will be noted in Figure 3 that the depending arms 27 and 28 are inclined toward one another, arm 28 having the greater inclination relatively to the bight portion, but in actual use is substantially vertical in position as secured to the handle 18 and the land-side 11, the other arm 27 and the wing or flange 29 being slightly curved so as to accommodate the arm to the curvature of the mold-board and the part where secured. It will also be noted that the arms 27 and 28 are inclined in opposite directions relatively to the plane of the bight portion 24 as clearly shown in Figures 4 and 5, this inclination being necessary in order to accommodate the brace member to the position of the members to which these arms are secured.

It will be apparent that when the brace is in the position as shown in Figure 1 that the handles and mold-board and land-side will be adequately braced to make a rigid plow share, and at the same time no obstructions are placed between the land-side and the plow share adjacent to the bases thereof, so that any dirt or clods dropping between the mold-board and land-side is immediately voided, and no choking of the clods and earth between the mold-board and land-side will take place.

I claim as my invention:—

1. A brace for mold-board plows, comprising an inverted substantially U-shaped brace member, said member including a relatively long bight portion providing a cross brace, lugs extending outwardly from said bight portion and adapted to be secured to the handles of a plow in a relatively high position in relation to the bottom of the mold-board and land-side to provide an unobstructed clearance for dirt clods falling between the mold-board and land-side.

2. In combination with plow share including a mold-board and a land-side, upright handle supports secured to the inner sides of said mold-board and land-side, and plow handles secured to said supports, a cross-brace provided with outwardly extending lugs, said brace being secured to said handles at substantially the height of the upper edge of the mold-board and providing an unobstructed clearance between the mold-board and land-side adjacent to the base portions thereof.

3. In combination with plow share including a mold-board and a land-side, upright handle supports secured to the inner sides of said mold-board and land-side, and plow handles secured to said supports, a cross-brace provided with outwardly extending lugs, said lugs being secured to said handles at substantially the height of the upper edge of the mold-board and providing an unobstructed clearance between the mold-board and land-side adjacent to the base portions thereof, and downwardly extending arms on said cross-brace secured to the mold-board and land-side respectively.

4. In combination with plow share including a mold-board and a land-side, upright handle supports secured to the inner sides of said mold-board and land-side, and plow handles secured to said supports, a cross-brace secured to the underside of said handles at substantially the height of the upper edge of the mold-board and providing an unobstructed clearance between the mold-board and land-side adjacent to the base portions thereof, perforate ears on said brace receiving securing means engaging said handles, and downwardly extending arms on said cross-brace secured to the mold-board and land-side respectively.

5. A brace for mold-board plows, comprising an inverted U-shaped brace member having a relatively long bight portion providing a cross-brace, perforated ears on said bight portion adapted to be secured between the handles of a plow, the side arms of said U-shaped member being inclined from said bight portion towards one another and also inclined in opposite directions from the plane of the bight portion, one of said arms having an outstanding wing securable to the plow mold-board, and the other arm adapted to be connected to the plow land-side.

6. A brace for a plow share, said brace constituting a U-shaped member having spaced ears extending outwardly from one face thereof and being adapted to be secured to the plow handles, said brace terminating in downwardly extending arms, one of said arms being provided with a flange extending from one face thereof, said flange being shaped to conform with and being secured to the mold-board, and the other arm being offset inwardly and adapted to be secured to a flange which in turn is secured to a land-side.

CHARLIE M. FISH.